United States Patent [19]

Inks

[11] 4,163,727

[45] Aug. 7, 1979

[54] ACIDIZING-GEL COMPOSITION

[75] Inventor: Clyde G. Inks, Taylor, Mich.

[73] Assignee: BASF Wyandotte Corporation, Wyandotte, Mich.

[21] Appl. No.: 857,590

[22] Filed: Dec. 5, 1977

[51] Int. Cl.² .............................................. E21B 43/27
[52] U.S. Cl. ............................... 252/8.55 C; 166/307; 252/316
[58] Field of Search ...................... 252/8.55 D, 8.55 R, 252/316, 8.55 C; 166/282, 307

[56] References Cited

U.S. PATENT DOCUMENTS

| | | | |
|---|---|---|---|
| 2,596,137 | 5/1952 | Fast | 166/308 x |
| 2,763,326 | 9/1956 | Cardwell et al. | 166/282 |
| 3,548,945 | 12/1970 | Gidley | 166/307 |
| 3,579,465 | 5/1971 | Schmolka | 252/316 |
| 3,740,421 | 6/1973 | Schmolka | 252/316 X |
| 3,923,666 | 12/1975 | Dill | 252/8.55 |
| 4,061,580 | 12/1977 | Jahnke | 252/8.55 |
| 4,068,720 | 1/1978 | Hessert et al. | 166/307 X |

OTHER PUBLICATIONS

Technical Data on Pluronic Surfactants as Rinse Aids, Brochure by Wyandotte Chemicals Corp., Wyandotte, Michigan.
BASF Wyandotte Chemicals for Industry, Brochure by BASF Wyandotte Corporation, Wyandotte, Michigan.

*Primary Examiner*—Herbert B. Guynn
*Attorney, Agent, or Firm*—John W. Linkhauer; Joseph D. Michaels; Robert E. Dunn

[57] ABSTRACT

The output of an oil well is improved by supplying thereto an acidizing-gel composition which consists essentially of, for example, about 15 weight percent of hydrochloric acid, about 20 weight percent of a suitable nonionic gel-forming surfactant containing oxyethylene and oxypropylene units, a corrosion inhibitor to the extent needed, and the balance water. The polymer is of high molecular weight, and though the composition containing such polymer is fluid at the temperature prevailing at the surface, nevertheless it forms a gel at the relatively higher temperatures present in the oil-bearing rock formation under the ground. This makes it possible to exert increased pressure on the oil-bearing rock formation, and it contributes to the effectiveness of the acidizing treatment.

14 Claims, No Drawings

ACIDIZING-GEL COMPOSITION

BACKGROUND OF THE INVENTION

1. Field of the Invention

This invention relates to acidizing compositions for use in the petroleum industry, and in particular, it relates to an acidizing composition which has the property of forming, at temperatures encountered in oil-bearing rock strata, a thickened, gel-like composition, which makes it possible to exert also increased physical pressure upon the rock formation being treated, thereby contributing to the effectiveness of the treatment for increasing the rate of production of the well.

2. Description of the Prior Art

It is known, in the petroleum industry, that the output of an oil well may sometimes be increased by "acidizing" the well. This is done, for example, by injecting into the well a composition which consists essentially of about 15 weight percent of hydrochloric acid, with the remainder being water and preferably minor amounts of other additives, such as corrosion inhibitors or the like. When the oil is present, in, for example, strata of rock containing substantial amounts of carbonates, the acid serves to open up or break up such rock formations and cause the oil present therein to be released more readily. The acidizing compositions hitherto used have not, to the inventor's knowledge, had the property of forming a semi-solid gel at the temperatures encountered in the oil-bearing rock formation. For a discussion of acidizing and similar treatments to improve the production of an oil well, see the article by R. E. Hurst in *The Oil and Gas Journal*, Apr. 13, 1970, pp. 80 to 85.

In view of the above-mentioned article in *The Oil and Gas Journal*, it must also be admitted that those skilled in the art of stimulating oil wells to increase their production are aware of a technique called "hydraulic fracturing," and that various oil-based and water-based compositions of matter have been used for such purpose, including "gelled kerosine" (sic). The idea of forcing a gel into the fractures or vugs, to increase the rate of production of the well so treated, is thus not a new one. The article indicates, moreover, that when fracturing by hydraulic pressure is practiced, it is also known that there should be introduced something like sand or tempered-glass beads, as a propping agent, to keep open the fractures which may have been created and/or propagated by the use of hydraulic pressure. The above-mentioned article and the other known prior art do not, in any event, indicate the possibility of providing any composition which, although quite fluid and pumpable at the temperatures which prevail at the surface of the earth, nevertheless have the property of becoming gelled when subjected to an environment of higher temperature, i.e., in the subterranean strata to be treated.

It is known, for example, from U.S. Pat. No. 2,674,619, that it is possible to make any of a variety of nonionic surface-active agents which are in the nature of a block copolymer of the formula

H(OC$_2$H$_4$)$_a$(OC$_3$H$_6$)$_b$(OC$_2$H$_4$)$_c$OH, where a, b, and c have various average values which influence importantly the nature of the surfactant product. In particular, it is known that with a surface-active agent of the general formula indicated above, with values of a and c of approximatey 95 and a value of b of approximately 69, it is possible to obtain a surface-active agent which has the property, when used at a rate of approximately 15% or more in an aqueous medium, of forming a gel. It is also known that acid-containing compositions are, other things being equal, more difficult to cause to gel, than similar compositions, without the acid present, are.

It is known, moreover, that nonionic surface-active agents of the kind indicated above have a tendency to exhibit lower solubility in hot water than in cold water. It is also known that with the ones which have the capability of forming aqueous gels, it is somewhat easier to form a gel when the aqueous medium is warmer than when it is colder.

It has also been known, in accordance with the prior art, that nonionic surfactants which are block copolymers having terminal blocks of oxyethylene units and a central block of oxypropylene units, have been proposed for a use in connection with the acidizing of oil wells. There is, for example, a brochure titled *Technical Data on Petroleum Production*, published by Wyandotte Chemicals Corporation in about 1960, in which there is proposed the addition of combinations of "PLURONIC Polyols F-68 and L-64," for the purpose of combining "the properties of wetting, demulsifying (emulsion prevention), low foaming, and sequestering." These are, of course, different block-copolymer nonionic surfactants from the ones proposed for use in accordance with the present invention; the ones proposed in the above-mentioned brochure are of lower molecular weight and are not known for their gel-forming properties, and it is also worth noting that in the most pertinent passage of the brochure, there is contained the sentence: "The concentration of 'PLURONIC' used is usually less than 0.5%." The nonionic surfactants used in the present invention do not form gels at any such low concentration of nonionic surfactant.

The practice of the present invention can also be distinguished from that disclosed in U.S. Pat. No. 4,044,833, in which an acidizing gel is made with the use of carboxymethylcellulose polymers, polyacrylamide, or polysaccharide as a gelling agent, and then it has a foam-forming surfactant added to it before being applied to the subterranean rock formations of the well to be treated. The practice of the present invention affords the advantage that any gel is formed in situ in the rock formation, so that the acidizing medium is easier to handle.

SUMMARY OF THE INVENTION

There is made an aqueous composition which is fluid at ordinary temperatures but capable of forming a gel at a moderately advanced temperature, such as 50° to 60° C., and it contains an effective amount of hydrochloric acid or some equivalent thereof, such as an aqueous solution which contains an appropriate proportion of fluoride ions, or a suitable organic acid in place of the hydrochloric, and usually also a corrosion inhibitor to the extent necessary. Such a composition is used by being injected into an oil well, to improve the output thereof. One such composition is made which contains about 15% of hydrochloric acid, about 20 weight percent of a surface-active agent of the kind indicated above, preferably some minor amounts of ingredients which are added to inhibit corrosion, and the remainder substantially water.

DESCRIPTION OF THE PREFERRED EMBODIMENTS

In accordance with the invention, there is made a composition of matter which consists essentially of three components: (1) hydrochloric acid or its equivalents, (2) water, and (3) a gel-forming nonionic surfactant, in a proportion capable of causing the composition to form a gel at a temperature of use, i.e., the temperature prevailing within the oil-bearing stratum or strata of rock being treated, in order to increase the rate of production of the well. The composition also usually contains a corrosion inhibitor, to the extent necessary.

It is usual, in making compositions for use in acidizing oil wells, to use 12 to 30, and preferably approximately 15, weight percent of hydrochloric acid. In one manner of practicing the present invention, hydrochloric acid of a concentration of approximately 15 weight percent is used. As is also well known in this art, there are strata which also contain siliceous material (which hydrochloric acid alone will not attack), and for such strata, compositions that contain fluoride ions are useful.

As the nonionic surfactant component of the composition, there is preferably used a material which may be characterized by the structural formula

where a and c have a value of about 90 to 112 and b has a value of approximately 65 to 75. One example is a material such as that commercially available from BASF Wyandotte Corporation as "PLURONIC F-127" polyol. This material has a nominal molecular weight of 12,500; a nominal molecular weight attributable to oxypropylene units of approximately 4,000; and a nominal polyoxyethylene content of approximately 70%.

Those skilled in the art will perceive how other similar nonionic surfactant materials, particularly those having a somewhat higher molecular weight, such as from about 4,000 up to 30,000, may also be used. Materials of greater molecular weight can be expected to yield gelling when used at a lower concentration, other things being equal. In accordance with the preferred embodiment of the present invention, the "F-127" product is used in the composition at the rate of about 20 percent by weight, but the proportion of nonionic surfactant used may sometimes be as low as 10 percent or as great as 40 percent. The principal considerations, in selecting the nonionic surfactant and the proportion in which it is used are (1) that for handling purposes it is very desirable that the composition be liquid and ungelled at the temperatures prevailing at the surface, and (2) that the proportion of nonionic surfactant and/or the molecular weight thereof be sufficiently high that, at the temperatures prevailing in the rock formation which is to be treated by acidizing, a gel will form. If the formation to be acidized is deeper (which means, other things being equal, hotter), it will then be possible, other things again being equal, to obtain the desired effect with a slightly lower proportion of nonionic surfactant, or with the same proportion of surfactant, but using one of somewhat lower total average molecular weight. The propensity of the nonionic surfactants to form gels increases as their total molecular weight increases, but at the same time, so does their tendency to be insoluble in water of a given temperature. Hence, there are limits to the proportion of nonionic surfactant used and the average molecular weight thereof, if the criterion of obtaining a composition which is fully fluid and readily pumpable at surface temperature is to be met.

The invention may also be practiced with various other nonionic surfactants, including those of the structural formula indicated above, wherein the typical molecular weight of the polyoxypropylene hydrophobe is about 2,250 or greater and the percent of polyoxyethylene hydrophilic units in the total molecular is about 40% or greater. In some instances, there may also be used other nonionic surfactants having similar properties in relation to HLB and total molecular weight, such as the corresponding members of the series of block copolymers which are made by capping polypropylene glycol with ethylene oxide, or those which are made by starting with ethylene diamine and then first oxypropylating and then oxyethylating.

In order to be somewhat more particular about the specifications for the nonionic surfactant to be used, there will be employed, in a preferred aspect of the invention, a nonionic surfactant of molecular weight between 4000 and 30,000, said surfactant being a formula selected from the group consisting of (a) a proportion effective to attack rock strata of an acid selected from the group consisting of hydrochloric acid, hydrofluoric acid, formic acid, acetic acid, and mixtures thereof;

(b) a proportion, effective to cause said composition to gel at the temperature of said rock strata but sufficiently low to cause said composition to remain liquid at ambient temperature, of a nonionic surfactant of molecular weight between 4000 and 30,000, said surfactant being of a formula selected from the group consisting of

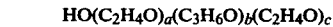
and

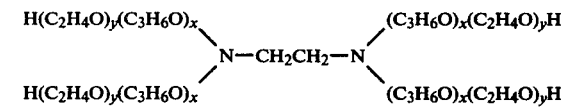

wherein a, b, and c are integers such that the poly(oxyethylene) hydrophilic portion of the molecule accounts for at least 25 percent of its molecular weight and the molecular weight of the poly(oxypropylene) hydrophobic portion of the molecular weight has a molecular weight greater than 2150 and wherein x and y are integers, and wherein x and y are integers such that the poly(oxyethylene) hydrophilic portion of the molecule accounts for at least 40 percent of its molecular weight and the molecular weight of the poly(oxypropylene) hydrophobic portion of the molecule has a molecular weight of at least 3250, and if the proportion of the molecular weight of the molecule accounted for by the polyoxyethylene units is less than 55 percent, greater than 5250.

With the use of the particular preferred material indicated above, there is a practical limit to the temperature of the oil-bearing strata which can be subjected to the acidizing treatment in accordance with the present invention. At temperatures much greater than approximately 50° to 60° C., there is the possibility that the gel will tend to become unstable. It is within the scope of the invention, in its broadest aspect, to provide and use compositions which contain appropriate acids, corrosion inhibitors, and gel-forming agents, provided all of these are ones such that (1) there produced a composition of matter which is liquid at the temperature of the surface and (2) such composition nevertheless forms at the temperature of use, in the oil-bearing strata to be treated, a stable gel which will enable an oil-well operator to conduct a treatment in which the acidizing action is accompanied by the substantial application of physical force which is made possible by the action of the gel, and (3) the treatment is, at the same time, not intolerably injurious to the well casing. Those skilled in the art will appreciate that, considering the trend in the petroleum industry to the drilling of deeper and hotter wells, there is room for the development of nonionic gelling agents of higher molecular weight, ones which would, other things being equal, either (1) yield, at a given temperature, a satisfactory gel when used at a lower concentration or (2) make possible the treatment of wells somewhat deeper and hotter than those indicated above as being suitable for treatment in accordance with the invention, in its present state of development.

Compositions which are used for acidizing oil wells to increase their production almost invariably include a corrosion inhibitor, to prevent the acid which is used from attacking the well equipment. As has been noted in the above-mentioned article in *The Oil and Gas Journal*, the development of the art of acidizing oil wells to improve production has, to a great extent, made progress only as more effective inhibitors are found and used. Such materials as sodium arsenite, imidazoline, abietylamine, coal-tar derivatives, and various combinations of acetylenic alcohol and alkylpyridine have been known and used as inhibitors. The problem of obtaining satisfactory inhibition becomes more difficult if the well is deeper and consequently hotter. As the above-indicated article indicates, with wells that are in the 350° to 500° F. temperature range, there has been a tendency to use, in place of hydrochloric acid, certain organic acids such as formic acid and acetic acid, because they are not so corrosive, and if one of them is used, it may in some instances be possible to omit the corrosion inhibitor, especially if the well is not a deep one. Those skilled in the art will understand, however, how to select and use an appropriate corrosion-inhibitor ingredient in compositions made in accordance with this invention, taking into account such factors as any compatibility problems, the kind of acid used, and the depth (temperature) of the oil-bearing strata concerned.

After such a composition is made, it is used by those skilled in the art of acidizing oil wells in the usual manner, except that preferably a greater pumping pressure is used, so that the carbonate-containing and/or silica-containing rock strata are influenced by both chemical and physical action.

In addition to the composition indicated above, i.e., 15 percent hydrochloric acid, 20 percent of "PLURONIC F-127," and the remainder water except for incidental amounts of corrosion in the inhibitor, there have been conducted tests to determine the gel temperature of other acid-containing compositions useful in connection with the present invention.

One example is the use of a composition consisting essentially of 12 percent hydrochloric acid, 3 percent hydrofluoric acid, 20 percent of "TETRONIC 1508" surfactant, and 65 percent water. "TETRONIC 1508" surfactant is a graft polymer based upon ethylene diamine which has first been oxypropylated to a typical molecular weight for the poly(oxypropylene) hydrophobe of 5501 to 7000 and then oxyethylated to such an extent that about 80 percent of the molecular weight of a typical molecule is provided by poly(oxyethylene) hydrophilic units. Such a material forms a gel upon heating to a temperature of 70 degrees Centigrade.

Another composition is one consisting of 15 percent by weight of hydrochloric acid, 5 percent formic acid, 30 percent "TETRONIC 1304" surfactant and 50 percent water. "TETRONIC 1304" surfactant is a block polymer based upon ethylenediamine which has first been oxypropylated to a typical molecular weight by the poly(propylene) hydrophobe of 5501 to 6000 and then oxyethylated to such an extent that about 40 percent of the molecular weight of a typical molecule is provided by poly(oxyethylene) hydrophilic units. Such a composition forms a gel upon heating to 55 degrees Centigrade.

Another composition for use in connection with the present invention is one consisting of 15 percent by weight of hydrochloric acid, 5 percent acetic acid, 40 percent "PLURONIC P85" surfactant, and 50 percent water. "PLURONIC P85" surfactant is a block copolymer based upon a central block of poly(oxypropylene) units of a typical molecular weight for the poly(oxypropylene) hydrophobe of 2250, then oxyethylated to such an extent that about 50 percent of the molecular weight of a typical molecule is provided by poly(oxyethylene) hydrophilic units. Such a composition forms a gel upon heating to a temperature of 44 degrees Centigrade.

Still another composition for use in connection with the present invention is one consisting of 9 percent formic acid, 39 percent "PLURONIC P105" surfactant, and 61 percent water. "PLURONIC P105" surfactant is a block polymer based upon a central block of poly(oxypropylene) units and a typical molecular weight for the poly(oxypropylene) hydrophobe of 3250, then oxyethylated to such an extent that about 50 percent of the molecular weight of the typical molecule is provided by poly(oxyethylene) hydrophilic units. Such a composition exhibits a gel when heated to 25 degrees centigrade.

While I have shown and described herein certain embodiments of my invention, I intend to cover as well any change or modification therein which may be made without departing from its spirit and scope.

The embodiments of the invention in which an exclusive property or privilege is claimed are defined as follows:

1. A composition of matter useful for acidizing rock strata in the secondary recovery of petroleum, said composition consisting essentially of
  (a) a proportion effective to attack rock strata of an acid selected from the group consisting of hydrochloric acid, hydrofluoric acid, formic acid, acetic acid, and mixtures thereof;
  (b) a proportion, effective to cause said composition to gel at the temperature of said rock strata but sufficiently low to cause said composition to remain liquid at ambient temperature, of a nonionic surfactant of molecular weight between 4000 and 30,000, said surfactant being of a formula selected from the group consisting of $HO(C_2H_4O)_a(C_3H_6O)_b(C_2H_4O)_cH$ and

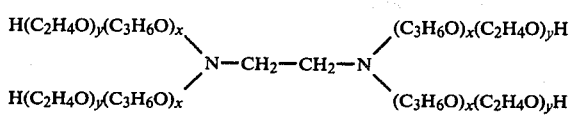
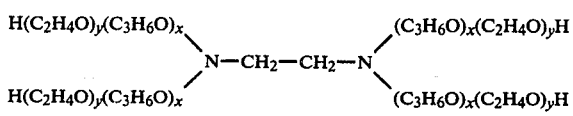

wherein
- a, b, and c are integers such that the poly(oxyethylene) hydrophilic portion of the molecule accounts for at least 25 percent of its molecular weight and the poly(oxypropylene) hydrophobic portion has a molecular weight greater than 2150 and
- wherein x and y are integers such that the poly(oxyethylene) hydrophilic portion of the molecule accounts for at least 40 percent of its molecular weight and the molecular weight of the poly(oxypropylene) hydrophobic portion of the molecule is at least 3250, and if the proportion of the molecular weight of the molecule accounted for by the polyoxyethylene units is less than 55 percent, greater than 5250; and
- (c) water.

2. A composition of matter as defined in claim 1, further characterized in that said composition contains an effective amount of a corrosion inhibitor selected from the group consisting of sodium arsenite, imidazoline, abietylamine, coal-tar derivatives, and combinations of acetylenic alcohol and alkylpyridine.

3. A composition as defined in claim 1, characterized in that said acid is hydrochloric acid, present in an amount of 12 to 30 weight percent, and in that said nonionic surfactant is one of the formula HO(C$_2$H$_4$O)$_a$(C$_3$H$_6$O)$_b$(C$_2$H$_4$O)$_c$H where a and c have a value of about 90 to 112 and b has a value of approximately 65 to 75.

4. A composition as defined in claim 3, wherein said nonionic surfactant is present to the extent of about 20 weight percent.

5. A composition as defined in claim 4, characterized in that said composition contains an effective amount of a corrosion inhibitor selected from the group consisting of sodium arsenite, imidazoline, abietylamine, coal-tar derivatives, and combinations of acetylenic alcohol and alkylpyridine.

6. A method of improving the recovery of petroleum from rock strata, said method comprising supplying to said rock strata a composition of matter effective for acidizing rock strata in the secondary recovery of petroleum, said composition consisting essentially of
- (a) a proportion effective to attack rock strata of an acid selected from the group consisting of hydrochloric acid, hydrofluoric acid, formic acid, acetic acid and mixtures thereof;
- (b) a proportion, effective to cause said composition to gel at the temperature of said rock strata but sufficiently low to cause said composition to remain liquid at ambient temperature, of a nonionic surfactant of molecular weight between 4000 and 30,000, said surfactant being of a formula selected from the group consisting of

and wherein
- a, b, and c are integers such that the poly(oxyethylene) hydrophilic portion of the molecule accounts for at least 25 percent of its molecular weight and the poly(oxypropylene) hydrophobic portion has a molecular weight greater than 2150 and wherein x and y are integers, and
- wherein x and y are integers such that the poly(oxyethylene) hydrophilic portion of the molecule accounts for at least 40 percent of its molecular weight and the molecular weight of the poly(oxypropylene) hydrophobic portion of the molecule is at least 3250, and if the proportion of the molecular weight of the molecule accounted for by the polyoxyethylene units is less than 55 percent, greater than 5250; and
- (c) water.

7. A method of improving the recovery of petroleum from rock strata as defined in claim 6, characterized in that said composition contains an effective amount of a corrosion inhibitor selected from the group consisting of sodium arsenite, imidazoline, abietylamine, coal-tar derivatives, and combinations of acetylenic alcohol and alkylpyridine.

8. A method of improving the recovery of petroleum from rock strata as defined in claim 6, said method comprising supplying to said rock strata a composition characterized in that said acid is hydrochloric acid, present in an amount of 12 to 30 weight percent, and in that said nonionic surfactant is one of the formula HO(C$_2$H$_4$O)$_a$(C$_3$H$_6$O)$_b$(C$_2$H$_4$O)$_c$H where a and c have a value of about 90 to 112 and b has a value of approximately 65 to 75.

9. A method of improving the recovery of petroleum from rock strata as defined in claim 8, wherein said nonionic surfactant is present to the extent of about 20 weight percent.

10. A method of improving the recovery of petroleum from rock strata as defined in claim 9, characterized in that said composition contains an effective amount of a corrosion inhibitor selected from the group consisting of sodium arsenite, imidazoline, abietylamine, coal-tar derivatives, and combinations of acetylenic alcohol and alkylpyridine.

11. A composition as defined in claim 1, consisting essentially of 15 percent by weight of hydrochloric acid, 5 percent acetic acid, 40 percent of said surfactant, and 50 percent water, and wherein said surfactant is based on a central hydrophobic block of polyoxypropylene units of a molecular weight of 2250 which is oxyethylated to an extent such than about 50 percent of the molecule is provided by polyoxyethylene hydrophilic units.

12. A composition as defined in claim 1, wherein said composition consists essentially of 9 percent formic acid, 39 percent of said surfactant, and 61 percent water, and wherein said surfactant is based on a central hydrophobic block of polyoxypropylene units of a molecular weight of 3250 which is oxyethylated to an extent such that about 50 percent of the molecular weight of the 13. A composition as defined in claim 1, wherein said composition consists essentially of 12 percent hydrochloric acid, 3 percent hydrofluoric acid, 20 percent said surfactant, and 65 percent water, and wherein said surfactant is based on ethylene diamine which has been first oxypropylated to a molecular weight for the polyoxypropylene hydrophobe of 5501 to 7,000 and then oxyethylated to such an extent that about 80 percent of the molecule is provided by polyoxyethylene hydrophilic units.

14. A composition as defined in claim 1, wherein said composition consists essentially of 15 percent by weight of hydrochloric acid, 5 percent formic acid, 30 percent said surfactant, and 50 percent water, and wherein said surfactant is based on ethylene diamine which has first been oxypropylated to a molecular weight for the polyoxypropylene hydrophobe of 5501 to 6,000 and then oxyethylated to such an extent that about 40 percent of the molecular weight of the molecule is provided by polyoxyethylene hydrophilic units.

* * * * *